Patented Nov. 19, 1935

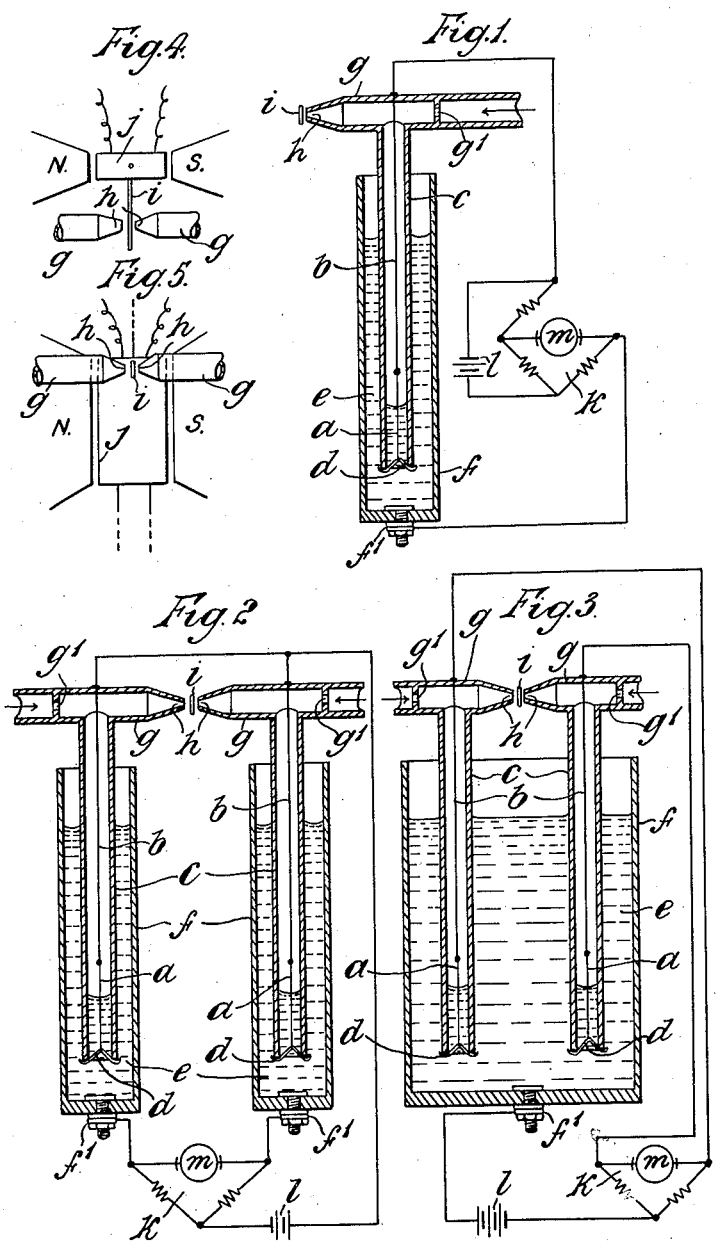

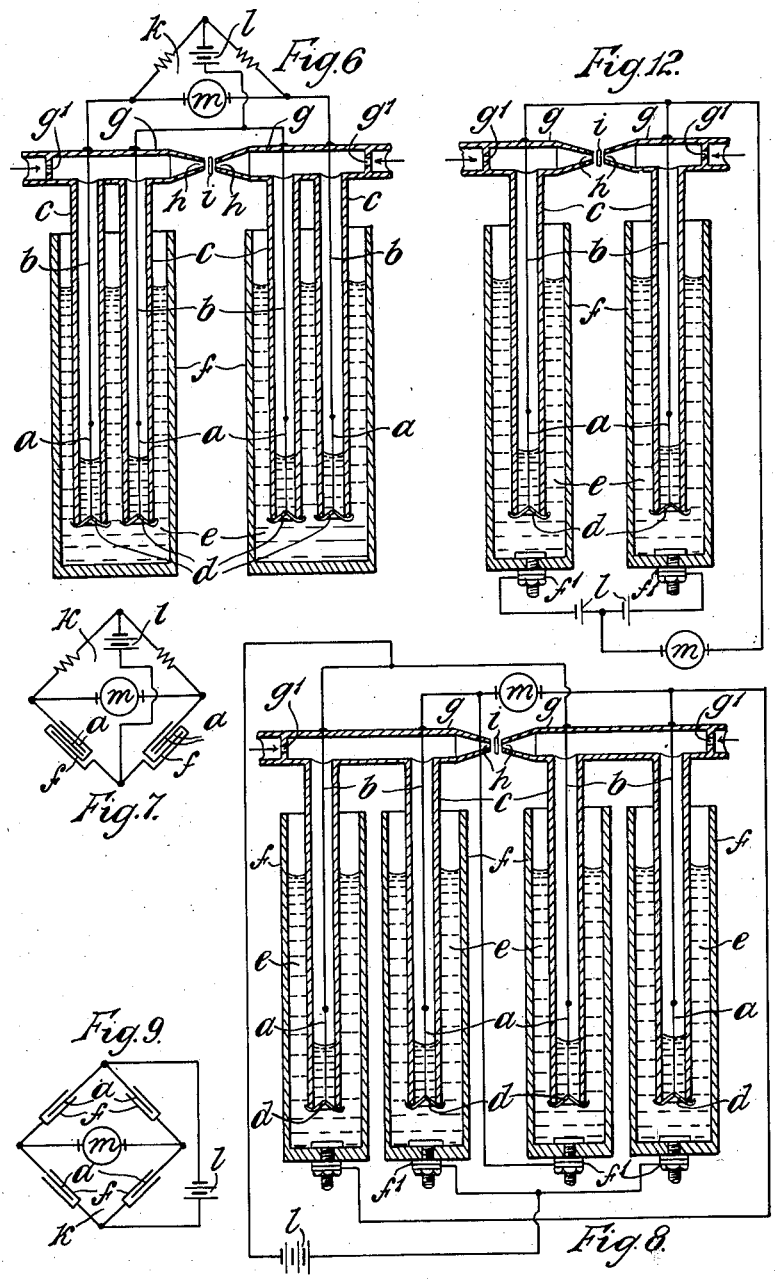

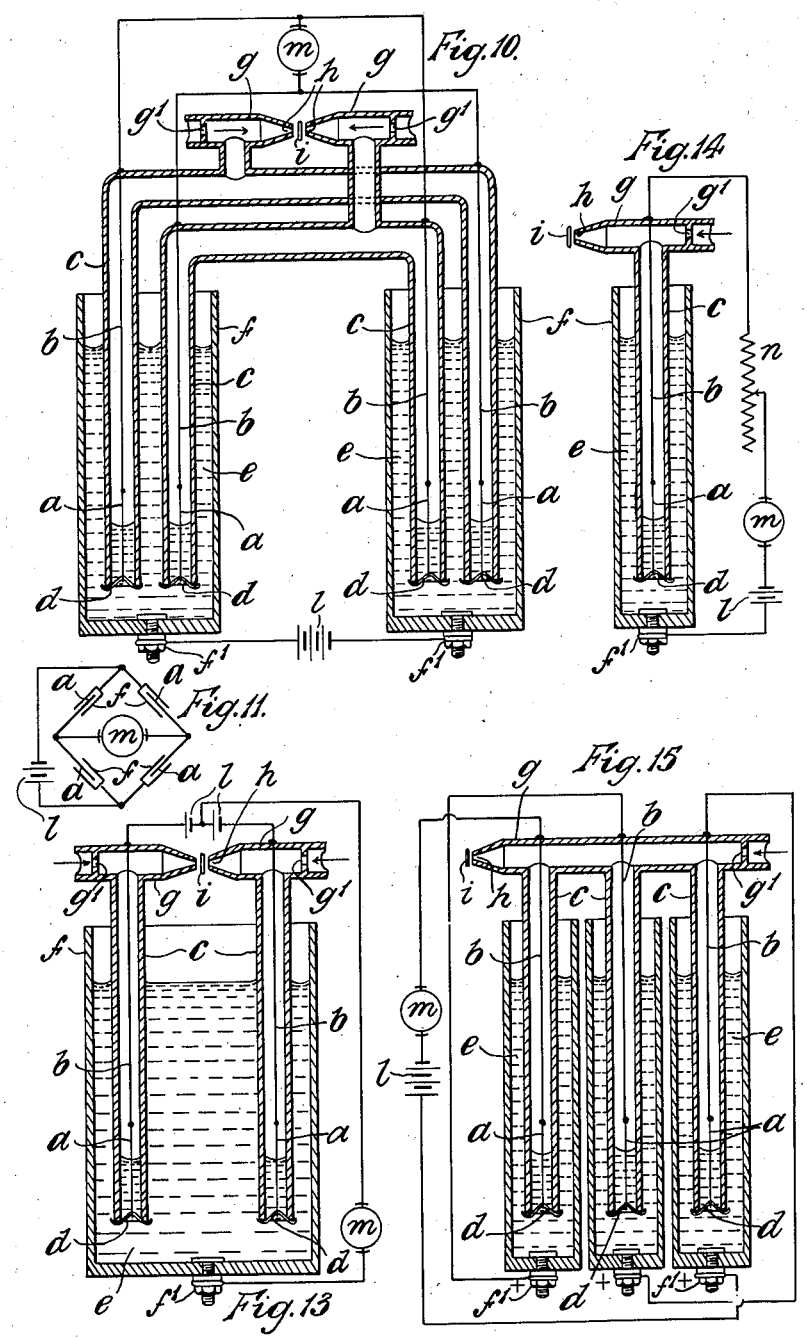

2,021,607

UNITED STATES PATENT OFFICE 2,021,607

APPARATUS FOR MAGNIFYING THE EFFECTS OF VIBRATIONS OF SMALL AMPLITUDE

Axel Orling and Charles William Orling, Streatham, London, England

Application April 17, 1934, Serial No. 720,982
In Great Britain April 21, 1933

6 Claims. (Cl. 178—70)

This invention relates to apparatus for magnifying the effects of vibrations of small amplitude, and is mainly, but not exclusively, intended for producing a legible indication or record of the vibrations of a moving coil or other vibrated member of a telegraphic receiver.

The object of the invention is to obtain electrically large magnification of the effects of vibrations by means of simple and reliable apparatus.

According to the invention, the effective length and resistance of a filament in an electric indicating or recording circuit is caused to vary by the variation in level of a conductive liquid tending to submerge the filament and depressed by the pressure of a gas constantly supplied, and constantly escaping from an orifice variably baffled by the vibrating member the effects of which are to be magnified.

The escape orifice is, for instance, directly baffled by a plate directly vibrated by the moving coil or other moving member of a telegraph receiver.

The variably submerged filament conveniently may be a fibre or strand of fibres of artificial silk, rendered conductive by being wetted with the liquid. To promote maintenance of the wetting, the flow of current is preferably arranged to be in the appropriate direction, namely from the bulk of the liquid to the wet silk filament, but this is not essential.

The silk filament conveniently is arranged upright in a glass tube open at its lower end and dipping into a volume of liquid, and the tube depends from and communicates with a chamber, for instance another tube transverse thereto, constantly supplied with compressed air through a small aperture, and having the variably baffled escape orifice. The silk filament, for instance, is connected between the lower end of a platinum wire depending inside the dipping tube, and a bridge at the lower open end of such tube.

The volume of liquid is, for instance, contained in a wider tube open to the atmosphere at the top and surrounding the dipping tube. An electrode is provided in contact with the liquid external to the dipping tube.

In the well known manner, the variable resistance can be arranged as the variable limb of a Wheatstone bridge having an electric indicator or recorder connected diagonally across the bridge. Alternatively, the circuit may be a split battery circuit with a filament in a dipping tube provided in each branch, and an electric indicator or recorder in the return lead in common of the circuit, the escape orifices of the dipping tubes being opposed with a baffle interposed. As a further alternative, the variable resistance, wetted filament may be connected, un-shunted, in series in a battery circuit including a spring or other loaded electric indicator or recorder.

Representative examples of apparatus according to the invention are illustrated diagrammatically on the accompanying drawings, in which:—

Fig. 1 shows a single wetted filament resistance in a dipping tube and connected as the variable limb of a Wheatstone bridge across which is connected an electric recorder.

Fig. 2 shows two inversely varied wetted, filament resistances in dipping tubes and connected as adjoining limbs of a Wheatstone bridge.

Fig. 3 is a view similar to Fig. 2 but showing the two dipping tubes dipping into a volume of liquid in common.

Fig. 4 is a plan and

Fig. 5 is a front elevation of a moving coil of an ocean cable telegraph receiver, and a plate thereon and moving therewith interposed between two opposed escape orifices.

Fig. 6 shows two pairs of wetted filament resistances in dipping tubes, the tubes of each pair dipping into a common volume of liquid, arranged as two adjoining limbs of a Wheatstone bridge, and Fig. 7 is the theoretical diagram thereof.

Fig. 8 shows four wetted filament resistances in dipping tubes all dipping into separate volumes of liquid, arranged as the four limbs of a Wheatstone bridge, and Fig. 9 is a theoretical diagram thereof.

Fig. 10 is a view similar to Fig. 8 but showing the dipping tubes dipping in pairs into volumes of liquid common to a pair, and Fig. 11 is the theoretical diagram thereof.

Fig. 12 shows the arrangement of two wetted filament resistances in different branches of a split battery circuit.

Fig. 13 is a view similar to Fig. 12 but with the two dipping tubes dipping into a single volume of liquid in common.

Fig. 14 shows a wetted filament resistance connected as a series resistance in an electric recorder circuit, and Fig. 15 shows three of such resistances connected in series in an electric recorder circuit.

Referring more particularly to Fig. 1, $a$ is a filament, for instance of artificial silk, rendered conductive by being wetted with an electro-conductive liquid, and connected between the lower end of a platinum wire $b$, depending within a tube c, and a bridge d at the lower open end of the tube c.

The tube c dips into a volume of electro-conductive liquid e, such as acidulated water, contained in a wider tube f open at the top to the atmosphere.

The dipping tube c is connected to and depends from a transverse tube g, providing a chamber to which compressed air is constantly supplied through a small aperture $g^1$, and from which the compressed air constantly escapes by a constricted orifice h, variably baffled by a plate i. This plate i is the vibrating member the effect of the vibrations of which are to be magnified, and may be an arm fast with the moving coil j of a telegraphic cable receiver, as shown in Figs. 4 and 5 in connection wtih a modified arrangement of the apparatus.

Referring again to Fig. 1, $f^1$ is a terminal, extending through the base of the outer tube f, whereby the liquid e in the outer tube f can be connected to an external electric circuit.

The filament a is connected, through the platinum wire b and the liquid e and terminal $f^1$, as one limb of a Wheatstone bridge k, energized by a battery l, and diagonally across which is connected an electric indicator or recorder m.

Minute variations in the baffling by the plate i of the escape orifice h produce considerable variations in the pressure of the compressed air in the tubes c and g exerted on and depressing the liquid in the dipping tube c, which liquid tends to rise therein under the pressure head of the external liquid e. The liquid level in the dipping tube c in consequence likewise undergoes correspondingly considerable variation, whereby there is considerable variation in the length of wetted silk filament exposed above the submerging liquid. The effective resistance of the filament a and of the limb of the Wheatstone bridge k, which it constitutes, will correspondingly widely vary. As a result of but minute variations in the position of the baffle plate i relatively to the escape orifice h, the considerable variations in the effective resistance of the filament a will result in correspondingly strong impulses being indicated or recorded by the indicator or recorder m.

In the above described arrangement and wherever possible in the arrangements described later, the electric connections are preferably such that the electric current flows in a direction tending to cause the liquid to maintain the filament a wet, namely the liquid e is at a positive potential relatively to the filament a.

As shown in Figs. 2 and 3, two wetter filaments a and dipping tubes c can be employed connected to form two adjoining arms of the Wheatstone bridge k, and with their escape orifices h opposed with a single baffle plate i interposed between them. These dipping tubes c may each dip into a separate volume of liquid e as shown in Fig. 2, or into one and the same volume e jointly, as shown in Fig. 3. In the latter case, Fig. 3, the degree of immersion of the two tubes and thereby the static pressure head opposed to the gaseous pressure, can be jointly adjusted. Moreover, and what is of more importance, the height of the column of liquid e in the outer tube f remains constant, as it is not affected by the vibration-effected variations in the levels of the liquid in the two dipping tubes c, as these variations are equal and opposite. The inertia of the liquid e, therefore, does not have to be overcome.

Figs. 4 and 5 already referred to show the mounting of the baffle plate i as an arm on a moving coil j, and interposed between the opposed escape orifices h.

As shown in Figs. 6 and 7, two dipping tubes c and two filaments a in series can be employed in each of two adjoining limbs of the Wheatstone bridge k, the two dipping tubes c of each limb dipping into a volume of liquid e in common and being connected to a single gaseous pressure chamber g for the respective limb, with the escape orifices h of the two chambers g opposed with a single interposed baffle i. In this arrangement the value of the resistance for a given depression of the liquid is doubled, as the current enters and leaves the respective volumes of liquid e by the two filaments a of each pair, which two filaments are both subjected to like degrees of submergence.

In another arrangement shown in Figs. 8 and 9, a filament a in a dipping tube c is provided in all four limbs of the Wheatstone bridge k, the dipping tubes c being connected in pairs to gaseous pressure chambers g in common, with the escape orifices h of the two chambers g opposed with a single interposed baffle i. The filaments a of these multiple arrangements are preferably, as shown, so connected in the circuit that the flow of current tends to maintain them wet, as above mentioned.

As shown in Figs. 10 and 11 the arrangement shown in Figs. 8 and 9 can be modified so that one dipipng tube c, connected to each gaseous pressure chamber g, dips into the same volume of liquid e, whereby, as described in connection with Fig. 3, the levels of the liquids e are not affected by the variations of level in the dipping tubes c.

Instead of the circuit being arranged as a Wheatstone bridge, it may be a split battery circuit as shown in Figs. 12 and 13, with a filament a in a dipping tube c provided in each branch, with opposed escape orifices h with an interposed baffle i. Such split battery circuit arrangement may have the dipping tubes c dipping into separate volumes of liquid e, Fig. 12, or into a volume of liquid e in common, Fig. 13. The variation in and changes of potential may be applied to the grid or grids of a valve or valves of a thermionic valve circuit.

As a further alternative, as shown in Fig. 14, the variable resistance, wetted filament a in a dipping tube c may be connected, un-shunted, in series in a battery circuit containing a spring or other loaded electric indicator or recorder m. Conveniently such circuit has also a hand-set variable resistance n in series to enable the initial value of the current and thereby the setting of the indicator or recorder m to be adjusted. As shown in Fig. 15, several, for instance three, of the filaments a in separate dipping tubes c, with a common gaseous pressure chamber g and baffled escape orifice h, may be included in series in the circuit. If more than two filaments are connected in series, the volumes of liquid must, as shown, be separate, but preferably separate volumes are always employed in the series arrangement, so that the current may flow in all in a wetting direction.

We claim:

1. In an apparatus for magnifying the effects of vibrations of small amplitude, a chamber supplied with gas under pressure and having an outlet orifice, a vibrating member baffling said orifice, a volume of electro-conductive liquid having a surface depressed by the pressure of said gas in said chamber, an electro-conductive filament dipping into said pressure-depressed surface of said liquid, and an electric circuit including said liquid in series with said filament.

2. In an apparatus for magnifying the effects of vibrations of small amplitude, a chamber supplied with gas under pressure and having an outlet orifice, a volume of electro-conductive liquid having a surface depressed by the pressure of said gas in said chamber, an electro-conductive filament dipping into said pressure-depressed surface of said liquid, a second chamber supplied with gas under pressure and having an outlet orifice opposed to said outlet orifice of said first-mentioned chamber, a vibrating member between and baffling both of said orifices, a second volume of electro-conductive liquid having a surface depressed by the pressure of said gas in said second chamber, an electro-conductive filament dipping into said pressure-depressed surface of said second liquid, and an electric circuit including said liquids in series with said filaments.

3. In an apparatus for magnifying the effects of vibrations of small amplitude, a chamber supplied with gas under pressure and having an outlet orifice, a volume of electro-conductive liquid having a surface depressed by the pressure of said gas in said chamber, an electro-conductive filament dipping into said pressure-depressed surface of said liquid, a second chamber supplied with gas under pressure and having an outlet orifice opposed to said outlet orifice of said first-mentioned chamber, a vibrating member between and baffling both of said orifices, the said volume of electro-conductive liquid having a second surface depressed by the pressure of said gas in said second chamber, an electro-conductive filament dipping into said second pressure depressed surface of said liquid, and an electric circuit including said liquid in series with said filaments.

4. In an apparatus for magnifying the effects of vibrations of small amplitude, a chamber supplied with gas under pressure and having an outlet orifice, a vibrating member baffling said orifice, a volume of electro-conductive liquid, a tube communicating with said chamber and open at its lower end and dipping into said liquid, an electro-conductive filament extending within said tube and dipping into said liquid, and an electric circuit including said liquid in series with said filament.

5. In an apparatus for magnifying the effects of vibrations of small amplitude, a chamber supplied with gas under pressure and having an outlet orifice, a volume of electro-conductive liquid, a tube communicating with said chamber and open at its lower end and dipping into said liquid, an electro-conductive filament extending within said tube and dipping into said liquid, a second chamber supplied with gas under pressure and having an outlet opposed to said outlet orifice of said first-mentioned chamber, a vibrating member between and baffling both of said orifices, a second volume of electro-conductive liquid, a tube communicating with said second chamber and open at its lower end and dipping into said second liquid, an electro-conductive filament extending within said second-mentioned tube and dipping into said second liquid, and an electric circuit including said liquids in series with said filaments.

6. In an apparatus for magnifying the effects of vibrations of small amplitude, a chamber supplied with gas under pressure and having an outlet orifice, a volume of electro-conductive liquid, a tube communicating with said chamber and open at its lower end and dipping into said liquid, an electro-conductive filament extending within said tube and dipping into said liquid, a second chamber supplied with gas under pressure and having an outlet opposed to said outlet orifice of said first-mentioned chamber, a vibrating member between and baffling both of said orifices, a tube communicating with said second chamber and open at its lower end and dipping into said same liquid, an electro-conductive filament extending within said second-mentioned tube and dipping into said liquid, and an electric circuit including said liquid in series with said filaments.

AXEL ORLING.
CHARLES WILLIAM ORLING.